United States Patent Office 3,331,018
Patented July 11, 1967

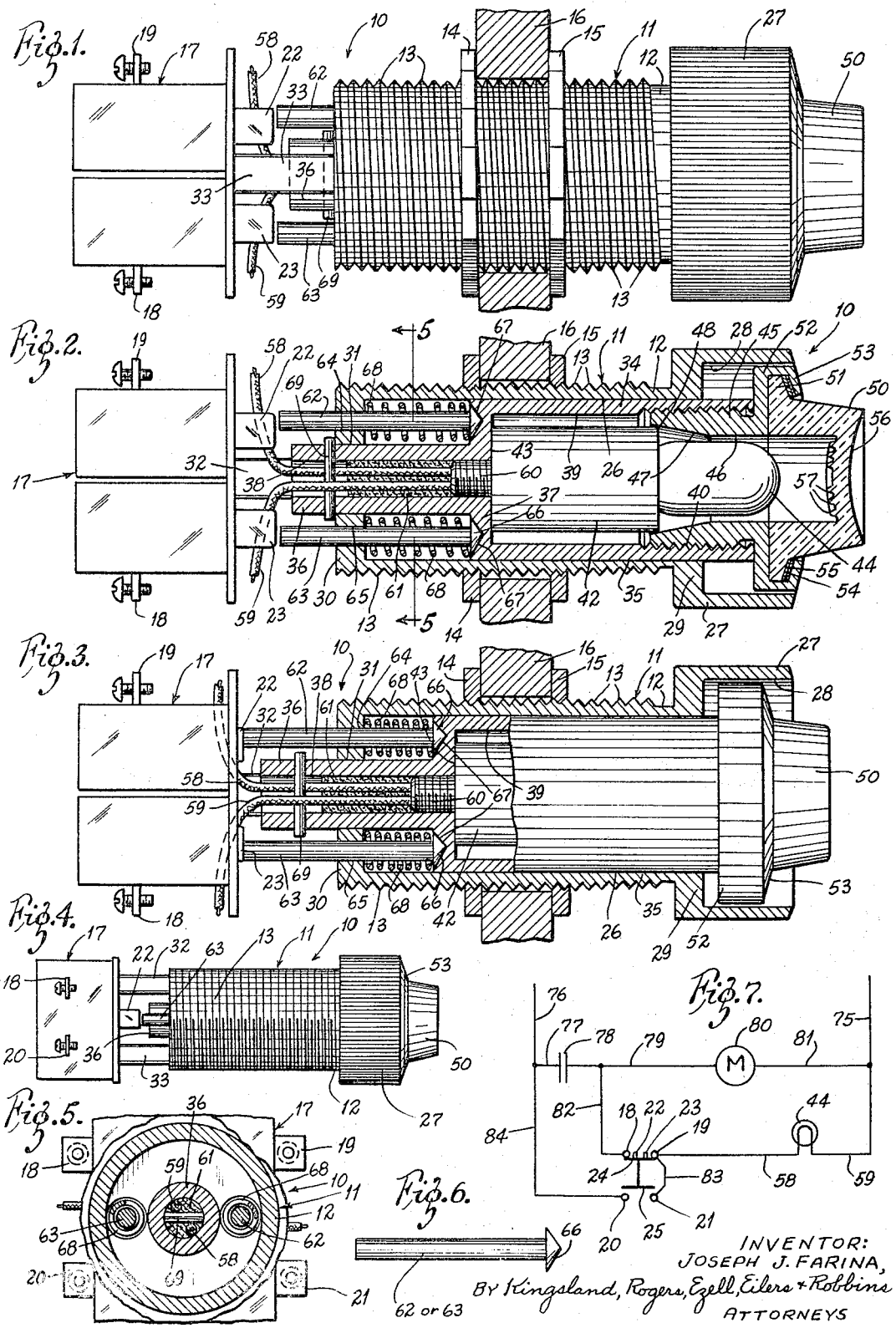

3,331,018
OPEN CIRCUIT INDICATOR WITH SLIDABLE HOUSING HAVING A LAMP INDICATOR THEREIN
Joseph J. Farina, Bridgeton, Mo., assignor to Killark Electric Manufacturing Company, St. Louis, Mo., a corporation of Missouri
Filed Sept. 14, 1964, Ser. No. 396,050
1 Claim. (Cl. 324—51)

This invention relates to an open circuit indicator and particularly to such an indicator having a lamp for evidencing whether or not a circuit is open. The device is particularly designed and constructed for use in hazardous locations, and is flame-tight and explosion-tight. The invention is especially directed to provisions for testing the lamp without destruction of the flame-tight and explosion-tight qualities.

In general, the invention comprises a generally tubular body externally threaded for attachment to a housing containing electrical apparatus. The body has a passage through it. A slide fits within the passage and supports a lamp. The slide and passage are ground to close tolerances so that the slide can move but will not pass a flame from an explosion occurring within the housing. The body is connected by a pair of posts to a switch box. The switch box has a pair of depressible buttons projecting toward the body, and there are a pair of operating shafts slidable with the slide for depressing the operating buttons.

The switch box is adapted to be connected to a main circuit and to an auxiliary circuit, both of which include the lamp. Ordinarily the main circuit is closed, and this circuit, which includes in it electrical apparatus which is normally operating, also includes the lamp. Therefore, the lamp remains illuminated as long as the electrical apparatus is operating, but if the apparatus malfunctions, the lamp goes out.

The auxiliary circuit is closed upon depression of the operating buttons when the slide is reciprocated. This opens the main circuit and closes the auxiliary circuit. The auxiliary circuit bypasses the apparatus and connects the lamp directly across an external power supply. This closing of the auxiliary circuit thereby enables testing of the lamp. If the test illuminates the lamp, the operator knows that it is the apparatus, not the lamp, which is defective.

The device is constructed for use in class I, group D, class II, groups E, F, and G, hazardous locations as defined by Article 500 of the National Electrical Code.

The general object of the invention is to provide an open circuit indicator for use in hazardous locations, and to provide appartus for testing the indicator. An object is to provide an indicator having a normally lighted lamp connected in a main circuit, which includes electrical apparatus subject to an explosion hazard, to indicate that the circuit is closed, whereby the lamp goes out to indicate that the main circuit is open, and to provide means enabling quick closing of an auxiliary circuit across the lamp for testing the lamp. Other objects are to provide such an indicator which is of simple construction, and which permits ready replacement of the lamp.

In the drawing:
FIGURE 1 is a side elevation view of the pilot light assembly shown mounted in the side of a typical housing wall;
FIGURE 2 is a view in longitudinal medial section of the pilot light assembly with the assembly in non-actuated condition;
FIGURE 3 is a view in partial section similar to that of FIGURE 2, but with the assembly shown in actuated condition;
FIGURE 4 is a side elevation view on a reduced scale showing the pilot light assembly rotated 90°, with the mounting nuts and a pair of wires being omitted;
FIGURE 5 is a view in section taken along the line 5—5 of FIGURE 2;
FIGURE 6 is a side elevation view of an operating shaft; and
FIGURE 7 is a wiring diagram of the assembly and the way it is wired with an operating apparatus.

The drawing and the following description set forth a device having a pilot light connected in a circuit which includes an electrical apparatus mounted in a housing and subject to an explosion hazard. When the circuit is opened, as upon malfunction of the electrical device, the pilot light goes out. A feature of the invention is the provision of an easily operable means for closing an auxiliary set of contacts across the light without destroying the explosion-tight construction of the device. These auxiliary contacts are adapted to be connected to an auxiliary circuit not including the electrical device. Therefore, the light can be tested to confirm that it is the electrical device and not the light which has opened the main circuit.

The pilot light device 10 comprises a body 11 having a cylindrical outer surface 12 with external threads 13. The threads 13 enable the body 11 to be fastened by a pair of nuts 14 and 15 to the wall 16 of any desired housing containing any desired electrical apparatus which is to be monitored. A switch box 17 is supported from the body 11 by parts to be described.

The switch box 17 has a pair of electrical terminal posts 18 and 19 and another separate pair of electrical terminal posts 20 and 21. A pair of depressible buttons 22 and 23 project from a side of the switch box 17. The buttons 22 and 23 are biased, such as by springs (not shown), to the positions illustrated in FIGURES 1 and 2, but are depressible to the positions illustrated in FIGURE 3. When the buttons occupy the positions illustrated in FIGURES 1 and 2, electrical contact between the terminal posts 18 and 19 is established. When the buttons 22 and 23 are depressed to the positions illustrated in FIGURE 3, contact between the terminals 18 and 19 is broken, but contact is established between the terminals 20 and 21. FIGURE 7 shows schematically how these contacts may be made as by contact elements 24 and 25 controlled by the buttons 22 and 23. When the buttons 22 and 23 are depressed they move the contact elements from the positions illustrated to positions where the element 25 touches the posts 20 and 21. The switch box 17 is a conventional device commercially available on the open market. Therefore, its construction need not be described further.

The body 11 is hollow with a cylindrical inner wall 26 opening to an enlarged head portion 27 having a cylindrical inner wall 28. There is an annular shoulder 29 at the base of the head 27. At the opposite end of the body, there is a radially inwardly extending wall 30 having an opening 31 through it.

The body 11 is connected to the switch box 17 by a pair of posts 32 and 33. These posts 32 and 33 are fastened to the switch box 17 and to the wall 30 of the body 11 by any convenient means, such as threaded studs (not shown).

Within the body 11, there is a slide 34. The slide 34 has a cylindrical wall 35 1⅞ inches long which is centerless ground to fit within the inner cylindrical wall 26 of the body 11. The centerless grinding provides a tolerance between the wall 35 and the inner wall 26 of the body 11 of less than 0.0015 inch. This close tolerance permits reciprocation of the slide 34, but will not allow a flame from an internal explosion to pass through from inside the housing 16 to the atmosphere. A smaller diameter cylindrical wall 36 is joined to the wall 34 by an annular transverse wall 37. The cylindrical wall 36 fits loosely through the hole 31 in the end 30 of the body 11.

The wall 36 is hollow with a cylindrical inner surface 38 communicating with a recess 39 defining the inner surface of the wall 35. The mouth of the recess 39 has internal threads 40, as shown in FIGURE 2.

A Bakelite lamp socket 42 is mounted within the recess 39, and has its inner surface 43 resting against the transverse wall 37. The socket 42 is conventional and holds an electric lamp 44. A bushing 45 threads into the threaded mouth 40 of the recess 39. The bushing 45 has an opening 46 through it for receiving the lamp 44. An internal beveled surface 47 engages the periphery 48 of the socket 42 to hold the socket 42 against the transverse wall 37.

A translucent cap 50 is molded of glass sufficiently strong to withstand an internal explosion generated by explosion of class D vapors or gases (National Electrical Code) with an annular base flange 51 fitted between a seat 52 and an inturned flange 53 on the bushing 45. The contacting surfaces between the base flange 51 and the seat 52 are ground flat with less than 0.0015 inch tolerance. There are two gaskets 54 and 55 between the base flange 51 and the inturned flange 53. The front wall 56 of the cap 50 is concave and is a minimum of ⅛ inch thick. A plurality of flutes 57 arranged in concentric rings are provided on the inner side of the wall 56. When the lamp 44 is illuminated, the light is transmitted through the cap 50.

Two wires 58 and 59 are connected to the socket 42 from a stud 60. The connection of the wires 58 and 59 is conventional to the extent that when they are connected in a closed electrical circuit, the lamp 44 illuminates. The wires 58 and 59 extend through the bore 38. The bore 38 is then filled with black sealing tar 61.

A pair of operating shafts 62 and 63 extend through holes 64 and 65 in the base 30 of the body 11. The operating shafts 62 and 63 have beveled heads 66 seated in complementary beveled recesses 67 in the transverse wall 37. There are compression springs 68 surrounding the operating shafts 62 and 63 and bearing against the wall 30 and the beveled heads 66. The springs 68 perform the dual function of holding the beveled heads 66 within the recesses 67 and biasing the slide 34 in a direction away from the depressible buttons 22 and 23. A pin 69 extends through the wall 36 and contacts the end 30 of the body 11 when the slide 34 is in such a position that the operating shafts 62 and 63 are barely free of the depressible buttons 22 and 23 when the buttons are in the positions illustrated in FIGURE 2.

FIGURE 7 illustrates schematically how the assembly of this invention may be wired in an electric circuit. The lamp 44 and the wires 58 and 59 leading from it are shown in FIGURE 7. One of these wires 58 is connected to the terminal 19. The other wire 59 is connected to one side 75 of an external electrical power source (not shown). The other side 76 of the external power source is shown with a wire connection 77 connected to it, the wire 77 leading from one side of a pilot switch 78. The other side of the pilot switch 78 is connected by a wire 79 to one side of a motor 80 or other electrical apparatus. The other side of the motor 80 is connected by a wire 81 to the external power supply line 75. A wire 82 leads from the wire 79 to the terminal 18.

Thus, the circuit to the motor 80 includes the wire 75 on one side of the power supply, the wire 81, the motor 80, the wire 79, the switch 78, the wire 77, and the other power supply wire 76. There is also a circuit through the terminals 18 and 19 and the lamp 44 provided by the wires 59, 60, and 82 connected between the power supply wire 75 and the wire 79, the contact element 24 normally occupying the position shown in FIGURE 7, closing the circuit between the terminals 18 and 19.

The pilot switch 78 is normally closed when the motor 80 is operating. This switch 78 is one which automatically opens when the motor 80 malfunctions in a manner known in the art.

There is an auxiliary circuit provided by a wire 83 connected between the terminals 19 and 21 and by a wire 84 connected between the terminal 20 and the power supply line 76. This auxiliary circuit, therefore, includes the power supply line 76, the wire 84, the terminals 20 and 21, the wire 83, the terminal 19, the wire 58, the lamp 44, the wire 59, and the power supply line 75. This circuit is normally open because the contact element 24 is normally spaced from the terminals 20 and 21. The auxiliary circuit is closed upon depression of the buttons 22 and 23 to close the contact element 24 against the terminals 20 and 21. This, of course, opens the main circuit by moving the contact element 24 away from the terminals 18 and 19.

The operation of this device is very simple once it is connected as generally illustrated in FIGURE 7. The contact terminals 24 and 25 normally occupy the positions illustrated in FIGURE 7, and when the motor or apparatus 80 is operating properly, the switch 78 is closed. This maintains the circuit to the lamp 44 closed and the lamp 44 remains illuminated while the motor or apparatus 80 operates. If the motor or apparatus 80 malfunctions, the switch 78 automatically opens, thereby opening the main circuit including the terminals 18 and 19 through the lamp 44. This causes the lamp 44 to go out, indicating that something is wrong with the motor 80.

The special feature of the invention is the provision for testing the lamp 44 to be certain that the motor 80, rather than the lamp 44, is defective. This testing is done by pressing on the cap 50, applying pressure to the thumb depression 56. This pressure causes the slide 34 to move to the left as viewed in FIGURES 2 and 3 against the force of the compression springs 68. The operating shafts 62 and 63 are thereby pressed against the buttons 22 and 23 to depress them. This causes the contact element 24 to move away from the terminals 18 and 19, as viewed in FIGURE 7, and the contact element 25 to move into contact with the terminals 20 and 21, closing the auxiliary circuit through the lamp 44. If the lamp 44 is in working order, it will light. Otherwise, it will remain dark, and the operator will know that the lamp is defective. He will then change the lamp 44 and test the new one before investigating any difficulties in the motor 80.

As soon as pressure is released from the cap 50, the compression springs 80 push the slide 34 back to the position illustrated in FIGURE 2.

Replacement of the lamp 44 is accomplished by simply rotating the bushing 45 to free it from the slide 34. This provides immediate access to the lamp 44 and it can be replaced.

Various changes and modifications may be made within the purview of this invention as will be readily apparent to those skilled in the art. Such changes and modifications are within the scope and teaching of this invention as defined by the claim appended thereto.

What is claimed is:

An open circuit indicator comprising a body, a cylindrical-walled passage extending through the body between opposite ends thereof, a cylindrical slide reciprocably received within the passage, the space between the cylindrical side of the slide and the cylindrical side of the passage being sufficiently narrow to prevent passage of a flame, button depressor means comprising a pair of floating shafts each having a head on one end, means defining recesses on the slide for receiving the heads, the shafts extending from one end of the slide beyond the adjacent end of the body, a compression spring surrounding each shaft and seated between the head of the shaft and the said adjacent end of the body, the springs thereby biasing the heads of the shafts into the recesses while biasing the slide away from the said adjacent end of the body, the said adjacent end of the body having guide openings through which the shafts extend, means accessible from the opposite end of the body enabling reciprocation of the slide relative to the body in opposition to the biasing forces of the compression springs, a switch box having a pair of operating buttons projecting from a side thereof, means to support the body and the slide on the switch box with the extended ends of the shafts positioned opposite the operating button, whereby reciprocation of the slide alternately depresses and releases the operating buttons, a lamp carried by the slide, the switch box having terminals associated with the operating buttons whereby depression of the operating buttons and alternate release thereof alternately opens and closes two alternate circuits to the lamp.

References Cited

UNITED STATES PATENTS

| | | | |
|---|---|---|---|
| 2,424,574 | 7/1947 | Marco | 340—214 |
| 2,780,801 | 2/1957 | Tyler | 340—214 |
| 2,995,737 | 8/1961 | Zimmerman | 340—214 X |
| 3,118,038 | 1/1964 | McKnight | 200—167 |
| 3,161,743 | 12/1964 | Roeser | 200—167 X |
| 3,183,333 | 5/1965 | Goldbeck | 200—167 X |

WALTER L. CARLSON, *Primary Examiner.*

G. R. STRECKER, *Assistant Examiner.*